Figure 1:
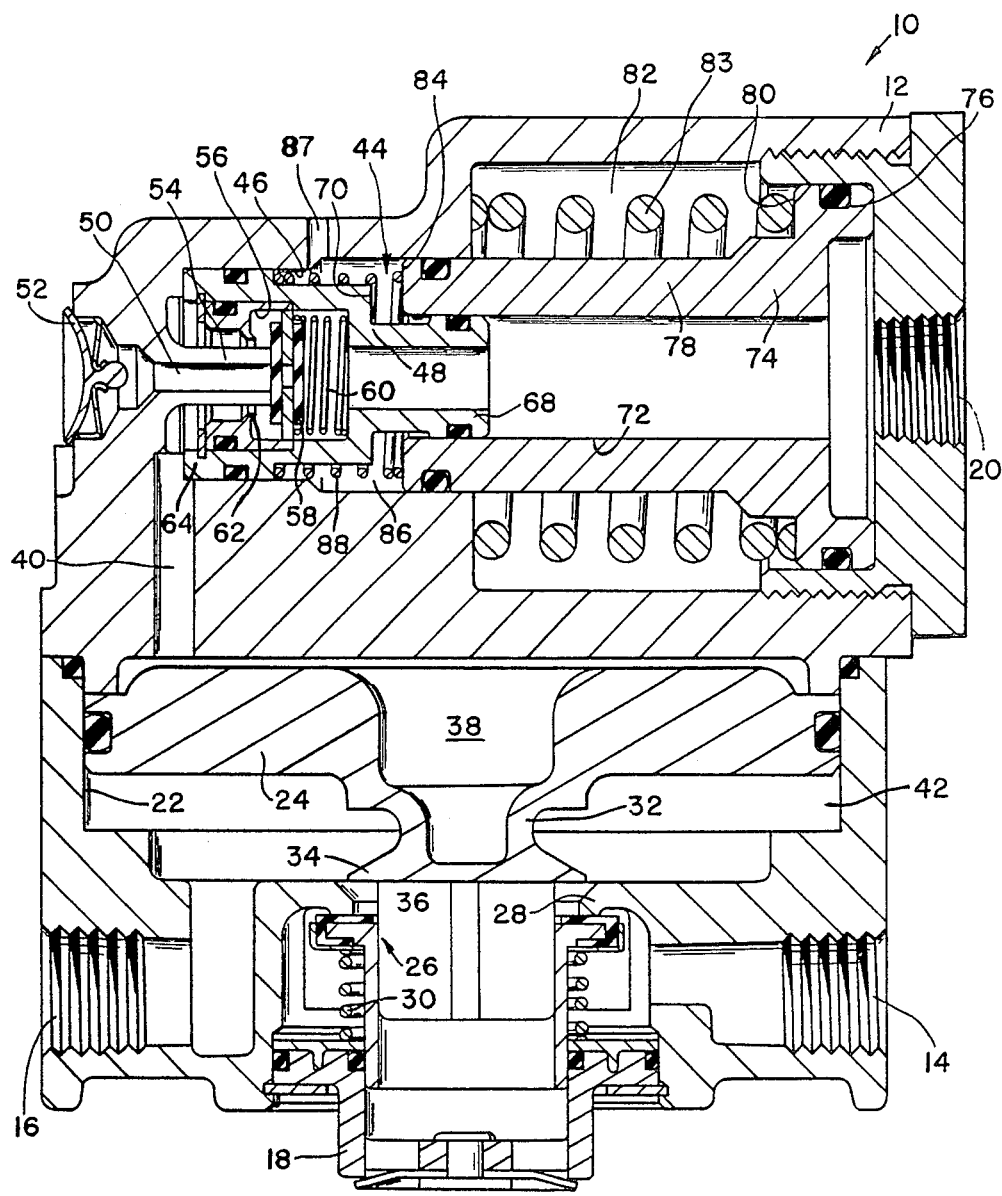

United States Patent [19]

Szudy et al.

[11] Patent Number: 4,758,051
[45] Date of Patent: Jul. 19, 1988

[54] PROPORTIONING CONTROL VALVE WITH SPRING BIASED CONTROL PISTON

[75] Inventors: James E. Szudy, Parma; Andrew Marsh, Elyria, both of Ohio

[73] Assignee: Allied Corporation, Morristown, N.J.

[21] Appl. No.: 95,275

[22] Filed: Sep. 11, 1987

[51] Int. Cl.[4] .............................................. B60T 11/12
[52] U.S. Cl. ....................................... 303/7; 303/9.66; 303/9.72
[58] Field of Search ................... 303/66.7, 13, 40, 52, 303/54

[56] References Cited

U.S. PATENT DOCUMENTS

| | | | |
|---|---|---|---|
| 4,230,373 | 10/1980 | Plantan | 303/7 |
| 4,261,624 | 4/1981 | Plantan | 303/7 |
| 4,348,062 | 9/1982 | Koenig | 303/7 X |
| 4,368,926 | 1/1983 | Bartholomew | 303/7 |
| 4,571,007 | 2/1986 | Carmichael et al. | 303/7 |

Primary Examiner—Duane A. Reger
Attorney, Agent, or Firm—Ken C. Decker; William N. Antonis

[57] ABSTRACT

A proportioning control valve for a fluid pressure braking system for a tractor-trailer combination vehicle permits unproportioned communication of control pressure when the tractor is pulling a trailer but proportions communication of control pressure when the tractor is operated without a trailer to establish a proportionally lower pressure level at the outlet of the valve. When the pressure level at the control port exceeds a predetermined level established by a spring, the control valve proportions at a rate which increases the pressure level at the outlet at a rate greater than the rate of increase of control pressure until the unproportioned pressure level is attained.

9 Claims, 1 Drawing Sheet

PROPORTIONING CONTROL VALVE WITH SPRING BIASED CONTROL PISTON

This invention relates to a proportioning control valve for a fluid pressure braking system for a tractor-trailer combination vehicle.

Heavy duty articulated vehicles, comprising a tractor pulling a loaded trailer, are in common use. Although the tractor normally pulls a loaded trailer, occasionally the tractor is used in the so-called "bobtail" mode, that is, without a trailer. Of course, since the tractor normally pulls a trailer, the rear brakes of the tractor must be sized to stop a loaded vehicle. However, when the tractor is operated in the bobtail mode, the rear wheels of the tractor are overbraked, which may result in dangerous skidding and loss of control. Accordingly, it has been proposed that a proportioning valve be provided to reduce the braking effort of the rear wheel brakes of the tractor. This proportioning valve would be responsive to the pressure level in the trailer supply line which connects the braking system of the tractor to the braking system of the trailer. When the tractor is operated normally, that is, pulling a trailer, the supply line is pressurized, but when the tractor is operated in the bobtail mode the supply line is vented to atmosphere. A prior art solution to this problem is disclosed in U.S. Pat. No. 4,571,007.

Accordingly, the present invention provides a proportioned brake application when the tractor is operated in the bobtail mode, but also permits equalization of the input and output pressures. Accordingly, the present invention eliminates several additional valves and plumbing which were required in prior art system. The present invention proportions communication up to a predetermined pressure which is determine by the ratio between the control pressure and a predetermined spring force, and thereafter permits full unproportioned braking pressure to be made available to the tractor rear wheel brakes.

Figure 2:
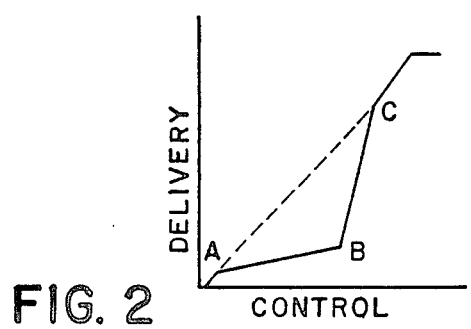

These and other advantages of the present invention will become apparent from the following specification, with reference to the accompanying drawings, in which:

FIG. 1 is a longitudinal cross-sectional view of a proportioning control valve made pursuant to the teachings of the present invention; and FIG. 2 is a graphical representation of the operation of the valve illustrated in FIG. 1.

Referring now to the drawing, a proportioning control valve 10 includes a housing 12 having an inlet port 14, an outlet port 16, an exhaust port 18, and a control port 20. The inlet port 14 is connected to the rear service reservoir on the tractor, the outlet port 16 is communicated to the rear wheel service brakes of the tractor, and the exhaust port 18 is, of course, communicated to atmosphere. The control port 20 is communicated to the operator actuated brake control valve in the vehicle operator's compartment. When a brake application is to be effected, the driver operates the brake control valve, to transmit a pressure signal to the control port 20 of a magnitude controlled by the vehicle operator. The valve 10 responds to this pressure signal to communicate the inlet port 14 with the outlet port 16 as will be hereinafter described.

Housing 12 defines a bore 22 therewithin which slidably receives a relay piston 24. A combination inlet and exhaust valve mechanism valve member 26 is slidably mounted in the bore defining the exhaust port 18. The housing 12 defines a circumferentially extending valve seat 28, which circumscribes the bore defining the exhaust port 18. A spring 30 yieldably urges the combination inlet and exhaust valve 26 into sealing engagement with the valve seat 28. As can be seen in FIG. 1, which illustrates the positions the relay piston 24 and inlet exhaust valve 26 assume when the brakes of the vehicle are released, the outlet port 16, which is communicated to the rearwheel service brakes of the vehicle, is normally communicated to the exhaust port 18 through the passage defined within the inlet and exhaust valve 26.

A stem 32 projects from the relay piston 24 and terminates a circumferentially extending valve seating area 34 which is adapted to engage the portion 36 of the inlet and exhaust valve 26. The region 38 above the relay piston 24 is communicated to the control port 20 through passage 40, as will be hereinafter described. Accordingly, when a brake application is effected, the fluid pressure representing the modulated brake application desired by the operator is communicated to the region 38. Since the region 38 is communicated to the higher pressure, and the region below the relay piston 24 indicated by the numeral 42 is communicated to the exhaust port 18, the piston 24 will be urged downwardly until the valve seat 34 seats against the seating area 36. This is the so-called "lap" position, in which communication between the outlet port 16 and the exhaust port 18 is cut off, but communication has not yet been initiated between the inlet port 14 and the region 42.

Further downward movement of the relay piston 24, sufficient to overcome the force of the spring 30, cracks open the inlet and exhaust valve 26 from the valve seating area 28, thereby permitting fluid pressure from the rear service reservoir communicated to the inlet port 14 to communicate into the region 42. Of course, since region 42 is communicated to the rear wheel brakes through the outlet port 16, this pressure level is also communicated to the rear wheel brakes, thereby effecting a brake application. When the pressure level in the region 42 balances the pressure level in the region 38, the relay piston 24 moves back to the lapped position. When the brakes of the vehicle are released, the region 38 is vented, thereby causing the higher pressure level in region 42 to return the relay piston 24 to the position illustrated, thereby causing the inlet and exhaust valve 26 to cut off communication from the inlet port 14 into the region 42 and venting the region 42 to atmosphere through exhaust port 18. The preceding description of the operation of the relay piston 24 and inlet and exhaust valve 26 is conventional for commercially available relay valves which have been used for many years.

The present invention relates to the proportioning mechanism generally indicated by the numeral 44 which is installed in the passage 40 and permits normal operation of the relay portion of the valve as described hereinabove when the tractor is connected to a trailer, but which normally proportions communication from the control port 20 into the region 38 when the tractor is operated in the "bobtail" mode. Proportioned communication establishes a proportionally lower fluid pressure level in region 38 than that at port 20, thereby effecting a proportionally reduced brake application, which, as described hereinabove, is necessary to prevent the severe overbraking which could occur when the tractor is operated in the bobtail mode.

The proportioning mechanism 44 includes a portion 46 of the passage 40 which slidably receives a differential area proportioning piston 48. An exhaust passage 50 communicates the portion 46 with an exhaust port generally indicated by the numeral 52. The passage 50 is defined within a stem 54 which projects into a passage 56 which is defined within the piston 48. The passage 56 is communicated to the control port 20 and also to the region 38. A valve member 58 is slidably mounted in the passage 56 and is slidably urged to sealing engagement with the end of the stem 54 by a small spring 60. A radially inwardly projecting valve seat 62 is carried by the piston 48 and is adapted to sealingly engage the valve member 58 when the piston 48 is urged to the right viewing the figure. However, when the piston is urged to the left viewing the figure, the valve seat 62 is moved away from the valve member 58 due to the engagement of the valve member 58 with the end of the stem 54. The valve member 58 is conventionally designed so that air pressure may communicate around the periphery of valve member 58 when the valve seat 62 is urged away from the valve member 58.

As discussed above, the piston 48 is a differential area piston and is stepped to define a larger diameter portion 64 and a smaller diameter portion 68 with a shoulder 70 therebetween. The larger diameter portion 64 is slidably received in the portion 46 of the passage 40, and the smaller diameter portion 68 is slidably received within a bore 72 defined within a second proportioning piston generally indicated by the numeral 74. The piston 74 slides within the housing 12 and includes a larger diameter portion 76 which cooperates with a smaller diameter portion 78 to define a shoulder 80 therebetween. The shoulder 80 cooperates with the housing 12 to define a cavity 82. A spring 83 in cavity 82 exerts a predetermined force on piston 74, yieldably urging the latter toward control port 20.

The end 84 of the smaller diameter portion 78 of piston 74 cooperates with the shoulder 70 and the housing 12 to define a cavity 86 therebetween. The cavity 86 is communicated to the trailer supply line through a port 87. The trailer supply line innerconnects the braking systems of the tractor and trailer and which is normally charged to a predetermined pressure level when the vehicle is operated as a tractor-trailer combination vehicle. On the other hand, when the tractor is operated in the bobtail mode without a trailer, the cavity 86 is vented to atmosphere, since the trailer supply line is not connected and is itself vented to atmosphere. A spring 88 is located in the cavity 86 and bears against both of the pistons 48 and 74 to urge them apart viewing FIG. 1.

In operation, and referring to FIG. 2, when the vehicle is operated as a tractor-trailer combination, the aforementioned supply line is pressurized. The pressure of the supply line interconnecting the tractor and the trailer is communicated to the cavity 86. Pressure in cavity 86, supplemented by the force of the spring 88, urges the piston 74 to right viewing the figure and urges the piston 48 to the left viewing FIG. 1. Since the proportioning piston 48 is held in a position in which the valve seat 62 is disposed away from the valve member 58 as long as the cavity 86 is pressurized, substantially uninhibited fluid communication between the control port 20 and the region 38 is permitted as long as the trailer supply line is pressurized to the predetermined level. Accordingly, the pressure level at the outlet port 16 will effect a brake application of substantially the same magnitude as the pressure level communicated from the vehicle brake valve to the control port 20. Operation of the valve 10 when the vehicle is so operated is illustrated by the dashed line in FIG. 2, which indicates that the pressure level at the control port 20, indicated on the horizontal axis, is substantially the same as that at the delivery port 16, indicated on the vertical axis. Accordingly, the control valve 10 does not proportion when the vehicle is operated as a tractor-trailer combination.

However, when the tractor is operated in the bobtail mode, the aforementioned trailer supply line is vented, thereby venting the pressure level in the cavity 86. Accordingly, the piston 48 is free to move since it is then biased then only by the spring 88. Since the cavity 86 is vented, piston 48 establishes a larger fluid pressure effective area on the larger diameter portion 64 of the piston 48 which is communicated to the pressure level in the region 38 and a smaller fluid pressure responsive area on the smaller diameter portion 68 of the piston 48 which is exposed to the fluid pressure level at the control port 20. As will be discussed hereinbelow, the piston 74 remains stationary until the pressure level at the control port exceeds a predetermined pressure level. At the predetermined pressure level, the force generated on piston 74 by the pressure at control port 20 exceeds the force of the spring 83, thereby causing the piston 74 to move.

During operation of the tractor in the bobtail mode, the pressure initially communicated through the control port 20 urges the piston 48 to the right until valve member 58 closes against valve seat 62 thereby initiating proportioning action. The proportioning piston 48 then establishes a fluid pressure level in region 38 that is a predetermined fraction of the pressure at control port 20, that fraction being determined by the ratio of the fluid pressure effective areas across the piston 48. This proportioning action of the piston 48, is indicated by line AB in FIG. 2. As is well known to those skilled in the art, an incremental increase in pressure at fluid pressure control port 20 acting across the effective area of the smaller diameter portion 68 of the piston 48 urges the piston to the left viewing FIG. 1, thereby opening the valve seat 62 from the valve member 58 to permit communication from control port 20 into region 38, but only a portion of this pressure increase will be felt in the region 38, because the smaller fluid pressure increase will be sufficient to reclose the valve seat 62 against the valve member 58 because of the larger fluid pressure effective area responsive to the pressure level in region 38.

As discussed hereinabove, the piston 74 remains stationary until the fluid pressure at control port 20 exerts a sufficiently large force on the piston 74 to overcome the force acting upon the piston 74 by the spring 83. When this predetermined pressure at control port 20 is established, the piston 74 moves to the left viewing FIG. 1, until the end 84 on the piston 74 engages the shoulder 70 of the piston 48. Accordingly, the pistons 74 and 48, during further increases of pressure at the control port 20, operate conjointly as a single piston. Since the effective area of this conjoint piston (comprised of the pistons 48 and 74) which is exposed to the fluid pressure level at control port 20 is now substantially larger than the effective area of the portion 64 of the piston 48 exposed to fluid pressure in region 38, an incremental increase of the pressure at the control port 20 will result in a proportionally larger increase in fluid pressure in the region 38. For example, if the pressure level at control port 20 is increased 1 psi and the pressure ratio across the conjoint piston is 2:1, the resulting increase in region 38 will be 2 psi. This proportional increase, represented by line B-C in FIG. 2, continues until the pressure level in region 38 equalizes with the pressure level at control port 20. Any additional increase of control means at port 20 urges the conjoint piston 48, 74 to the left viewing FIG. 1 to permit communication through passage 50. The curve ABC represents the bobtail operation of the system, and, as indicated by FIG. 2, unproportioned pressure is available to the vehicle operator beyond point C even when the vehicle is operated in the bobtail mode if it is necessary for the vehicle operator to make a full-on brake application. This may be due, for example, because of a failure in the front braking system.

We claim:

1. Proportioning control valve for a fluid pressure braking system for a tractor-trailer combination vehicle, said system including a trailer supply line communicating fluid pressure from the tractor to the trailer, said control valve including a housing having an inlet port, an outlet port, and a control port, valve means in said housing responsive to the pressure level at said control port for controlling communication between said inlet port and said outlet port, and proportioning means for controlling communication between said control port and said valve means, said proportioning means being responsive to the pressure level in said supply line for shifting from a nonproportioning condition permitting said valve means to establish a nonproportioned pressure level at said outlet port to a proportioning condition permitting said valve means to establish a pressure level at said outlet port that is a second predetermined function of the pressure level at said control port, said proportioning means including a pair of components, each of said components being responsive to the fluid pressure level at said control port, spring means opposing movement of one of said components but yielding to permit movement of said one component when the pressure level at said control port attains a first predetermined pressure level, the other component being responsive to pressure levels below said predetermined level to establish a pressure level at said outlet is a predetermined fraction of the pressure level at the control port, said components at pressures above said first predetermined pressure increasing the pressure level at said outlet in response to increased changes in the pressure level at said control port at a rate greater than the rate of pressure change at said control port.

2. Proportioning control valve as claimed in claim 1, wherein said other component is differential area piston means slidably mounted in said housing, and valve mechanism operated by said differential area piston means controlling communication between said control port and said valve means.

3. Proportioning control valve as claimed in claim 2, wherein said differential area piston means has a larger area exposed to the pressure level in the valve means and a smaller area exposed to the pressure level at said control port, said one component having a fluid pressure responsive area responsive to the fluid pressure level at said control port, said one component joining with said first component when the ratio of the areas across said differential area piston means changes so that said components move as a unit having a larger area exposed to the fluid pressure level at said control port and a smaller area exposed to the fluid pressure level at said valve means.

4. Proportioning control valve as claimed in claim 3, wherein each of said components includes means responsive to the pressure level in said supply line to hold said valve mechanism open when said proportioning means is in said first condition regardless of the pressure level at said control port.

5. Proportioning control valve as claimed in claim 2, wherein said differential area piston means includes means responsive to the pressure level in said supply line to cause said differential area piston means to hold said valve mechanism open when said proportioning means is in said first condition regardless of the pressure level at said control port.

6. Proportioning control valve for a fluid pressure braking system for a tractor-trailer combination vehicle, said system including a trailer supply line communicating fluid pressure from the tractor to the trailer, said control valve including a housing having an inlet port, an outlet port, and a control port, valve means in said housing responsive to the pressure level at said control port for controlling communication between said inlet port and said outlet port, and proportioning means for controlling communication between said control port and said valve means, said proportioning means being responsive to the pressure level in said supply line for shifting from a nonproportioning condition permitting said valve means to establish a nonproportioned pressure level at said outlet port to a proportioning condition permitting said valve means to establish a pressure level at said outlet port that is a second predetermined function of the pressure level at said control port, said proportioning means including a pair of components, each of said components having a fluid pressure responsive surface communicated to the pressure level at said control port, and spring means biasing one of said components to prevent movement of the latter until a pressure level at said control port is attained which is greater than the fluid pressure level at which the other component responds to the pressure at said control port.

7. Proportioning control valve means as claimed in claim 6, wherein said one component is a fluid pressure responsive piston having an effective area responsive to the pressure level at said control port, the force generated on said fluid pressure responsive piston by the pressure level at the control port acting on said effective area being opposed by said spring means.

8. Proportioning control valve means as claimed in claim 7, wherein said other component is a differential area proportioning piston having a larger area exposed to the pressure level in the valve means and a smaller area exposed to the pressure level at said control port.

9. Proportioning control valve means as claimed in claim 8, wherein said components are coaxial and move conjointly at pressure levels at said control port acting on the effective area of said one component to generate a force on the latter in excess of said force of said spring means if the pressure level in said control port is below said predetermined level.

* * * * *